United States Patent Office 3,314,398
Patented Apr. 18, 1967

3,314,398
AUTOMATIC ANIMAL SUCKLING APPARATUS
André Francois Legourd, Thiais, France, assignor of one-half to Michel Aime Joseph Legrain, Foulbec, Eure, France
Filed Jan. 28, 1965, Ser. No. 428,644
Claims priority, application France, Feb. 1, 1964, 7,031, Patent 1,392,672
5 Claims. (Cl. 119—71)

The present invention relates to an apparatus for the feeding of animals, particularly calves, by means similar to those of a natural udder.

The purpose of the invention is to provide such an apparatus for permitting an automatic and exactly proportioned preparation of the food to be given, such food, as it is well known, substantially consisting in milk obtained by the mixing and dissolving of milk powder to water. Of course, the said apparatus may likewise prepare other solutions or fluid mixtures.

The invention mainly consists in an apparatus comprising a mixer provided with a mechanical stirrer actuated by a motor and connected by a pipe to at least one point of drawing, and means ensuring the motion of the stirrer and the feeding of powder and liquid into the mixer, coming from bins, at a time when the hydrostatic pressure in the said mixer drops below a certain limit due to the consumption effected at the point of drawing.

The invention further consists in some other arrangements hereinafter mentioned and preferably used together with the above mentioned main arrangement.

The invention particularly covers certain modes of application and realization of the said arrangements and also the apparatus provided with such improvements.

By way of example and to provide a better understanding of my invention, a specification of a particular mode of carrying out the invention is given hereinafter, the same being illustrated in a schematic and non-restrictive manner in the accompanying drawing. In said drawing.

Figure 1:
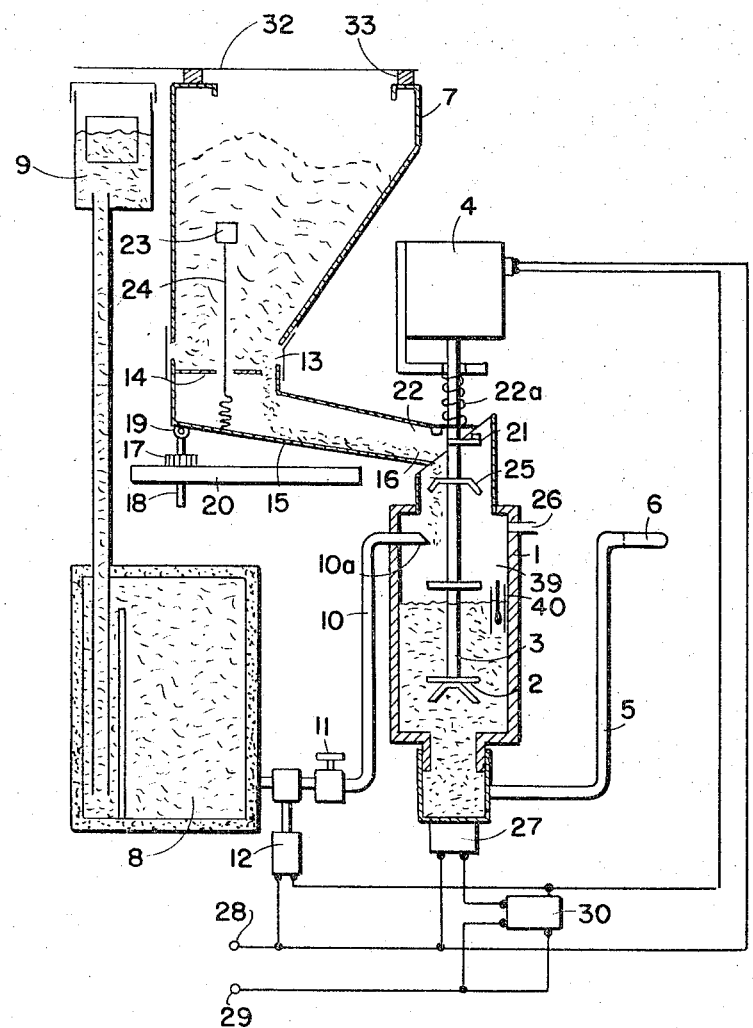
FIGURE 1 is a section by a vertical plane of an apparatus according to the invention.
Figure 2:
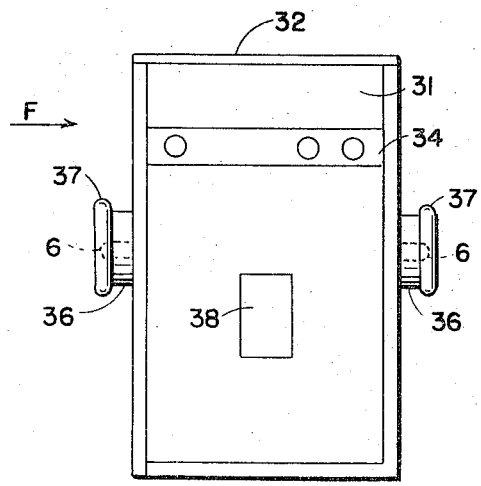
FIGURE 2 is an external view, in front elevation, of this apparatus.
Figure 3:
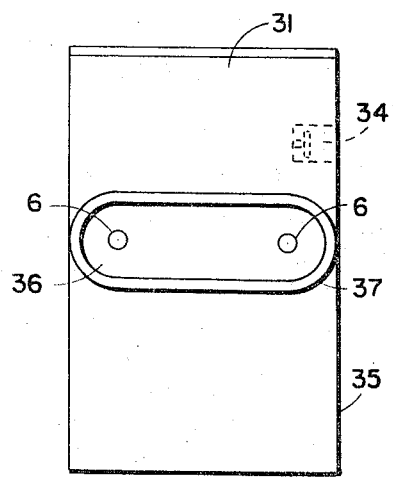
FIGURE 3 is a view, in lateral elevation, along the arrow F of FIGURE 2, of the same apparatus.

The apparatus, given as an example, is intended for the milk feeding of calves.

Referring to the drawings, this apparatus consists of a mixing chamber or mixer 1 provided with a mechanical stirrer 2, rotated by the shaft 3 driven by the electric motor 4 with a variable speed. The section of the mixer 1, perpendicular to the axis of the shaft 3, may be circular or square. A pipe 5 connects the basis of the mixer 1 to one or several dispensing outlets provided with nipples, such as 6, where the calves come and seek their food. The said food consists in milk which is the result of the mixing and dissolving in the mixer 1 of the milk powder contained in a bin or hopper 7, the necessary water coming from a tank 8.

This tank 8 is provided with a heating or cooling device, preferably electric, and a thermostat permitting to maintain its contents of water within appropriate limits of temperature. The tank 8 is preferably rendered nonconductive of heat. It is fed at the desired pressure by means of a tank 9 the level of which is kept constant and which is placed above the tank 8 and is connected to a water pipe (not shown in the drawing). The tank 8 is connected with the mixer 1 by a pipe 10 the flow of which may be manually controlled by a needle valve 11. Besides, this flow may be established or interrupted by a solenoid valve 12. The pipe 10 may end in a nozzle 10a ensuring a discharge tangential to the sides of the mixer.

The milk powder, contained in the hopper 7, may flow out through the adjustable opening 13 restricted by the diaphragm 14 in the sloping outlet transfer passage 15, ending in a lip 16 at the upper part of the mixer 1. The slope of the passage 15 may be modified by the turning of the nut 17, screwed on the threaded rod 18, which is linked, as shown in 19 to the passage. The nut 17 bears on a part 20 fixed to the frame of the apparatus.

To cause the flowing of the powder from the hopper 7 towards the mixer 1, the passage 15 vibrates under the action of a cam 21 rotating together with the shaft 2 and meeting, at every revolution, a boss 22 adjustably fixed on the said passage. A spring 22a pulls the boss 22 back to the cam. A weight 23, linked by the spring rod 24 to the passage 15, likewise vibrates and thus facilitates dropping of the powder contained in the hopper 7.

A part 25, similar to a stirrer and driven by the shaft 3, is placed immediately below the lip 16 and above the liquid level which may be in the mixer 1. In its motion, the part 25 breaks any powder lumps before coming into contact with the liquid in the mixer.

An overflow is placed in 26. When the apparatus is working normally, the level of the liquid in the mixer 1 lies below the upper part of the mixer to such an extent as the gases of the warm liquid, if any, are condensed in the said upper part before reaching the powder in the passage 15.

Whatever the volume of food draw by the animals from the nipples 6 may be, the level of the liquid in the mixer 1 is maintained at the height or within the limits fixed by a pressure gauge 27 placed at the bottom of the mixer 1 and responding to the hydrostatic pressure of the liquid in the mixer. For that purpose, the device 27 comprises a contact placed in an electric circuit fed from the terminals 28, 29, for instance by the network. When the hydrostatic pressure of the liquid in the mixer 1 tends to become lower than a certain height due to a decrease of the level, the contact of the device 27 closes, thus energizing a relay 30, said relay causes the opening of the solenoid valve 12 and starts the motor 4. The water in the tank 8 then enters into the mixer 1 and the rotation of the shaft 3, making the passage 15 vibrate causes a certain quantity of milk powder from the hopper 7 to drop into the mixer. During such operation, the flow of the water is set by the position of the valve 11 and the flow of the powder by the slope of the passage 15 and the speed of the motor 4. When the hydrostatic pressure of the liquid in the mixer 1 reaches another height again, the contact of the device 27 is opened, closing the solenoid valve 12 and stopping the motor 4. While the motor is running the stirrer 2 ensures the mixing and dissolving of the quantities of powder and water admitted into the mixer.

The entire device above described is advantageously placed in a cabinet 31. A removable cover 32, placed at the upper part of the said cabinet permits filling of the hopper 7 with milk powder. The said cover rests on the hopper by means of the seal 33.

The various controls for the adjusting of apparatus are set in a recess 34 of the front panel 35 of the cabinet so as not to protrude, and to be out of the animals' reach. The latter eat their food from the nipples 6 placed on the lateral sides of the cabinet, in recesses 36 surrounded by a pad 37.

Preferably, the mixer 1 is made of glass or of any transparent material. An opening 38 of the panel 35, placed in front of the mixer, permits examining of its contents, notably the level of the mixture. Due to the pressure gauge 27, the height of the said level, indicated by a graduation, may give useful information concerning the density of the mixture. The said density may likewise be measured by an areometer 39 placed into a transparent tube 40 inside the mixer, the said areometer being visible through opening 38.

It is obvious that the invention is not limited to the methods of application and to the embodiments herein described but extends to all modifications thereof.

What I claim is:

1. An apparatus for the feeding of animals comprising a mixing chamber having an inlet end and an outlet end, outlet means located at said outlet end, a powder hopper having a sloping outlet transfer passage including a vibrated element connected to said inlet end of said chamber, a liquid tank connected to said chamber, a liquid control means connected to said tank, a stirrer assembly including driving means and agitator shaft means mounted in said chamber, a vibrator mounted on said shaft adjacent the chamber end of said transfer passage and in intermittent contact with said vibrated element, pressure-actuated means at said chamber outlet end for controlling the liquid flow from said tank to said chamber and for selectively operating said driving means, said pressure-actuated means being responsive to liquid quantity, whereby when the level of the liquid in said mixing chamber is depleted, powder from said hopper and liquid from said tank are introduced into said mixing chamber and mixed, maintaining the desired level of mixed liquid in said chamber.

2. An apparatus for the feeding of animals according to claim 1, and means located in said hopper to facilitate the distribution of said powder, said means comprising a spring-supported weight, said weight being located in said hopper and said spring being located in said passage, whereby when said passage vibrates, said spring-supported weight vibrates.

3. An apparatus for the feeding of animals according to claim 1, and wherein said tank is provided with thermostatic means to maintain said liquid within desired temperature range.

4. An apparatus for the feeding of animals according to claim 1, and means to adjust the slope of said passage.

5. An apparatus for the feeding of animals according to claim 1, and a cabinet enclosing said apparatus, said cabinet being provided with at least one nipple connected to said outlet means, whereby said animals may feed from the contents of said mixing chamber.

References Cited by the Examiner

UNITED STATES PATENTS

| 2,642,837 | 6/1953 | Schroeder | 119—52 |
| 2,821,370 | 1/1958 | Varner | 259—10 |
| 3,037,481 | 6/1962 | Kloss | 119—71 |
| 3,097,627 | 6/1963 | Garcia | 119—51.11 |
| 3,196,835 | 7/1965 | Bergevin | 119—51.11 |

ALDRICH F. MEDBERY, *Acting Primary Examiner.*

SAMUEL KOREN, *Examiner.*